May 29, 1962 A. E. VOGEL 3,036,844
APPARATUS FOR CONTROLLING VEHICLE SUSPENSION
Filed April 12, 1956 7 Sheets-Sheet 1

INVENTOR.
ARTHUR E. VOGEL
BY
Schmieding and Fultz
ATTORNEYS

May 29, 1962 A. E. VOGEL 3,036,844
APPARATUS FOR CONTROLLING VEHICLE SUSPENSION
Filed April 12, 1956 7 Sheets-Sheet 2
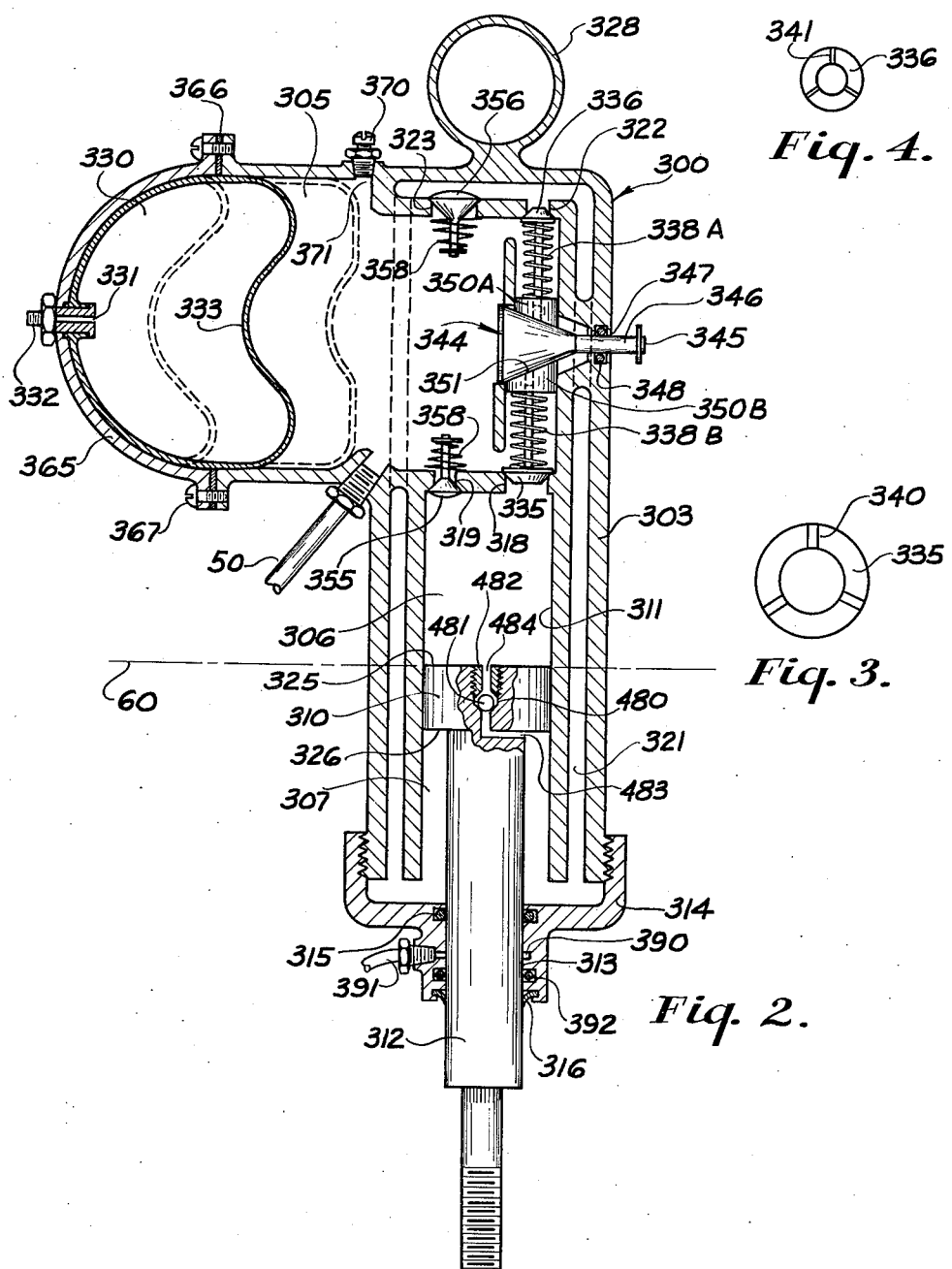
INVENTOR.
ARTHUR E. VOGEL
BY Schmieding and Fultz
ATTORNEYS INVENTOR.
ARTHUR E. VOGEL
BY
Schmieding and Fultz
ATTORNEYS

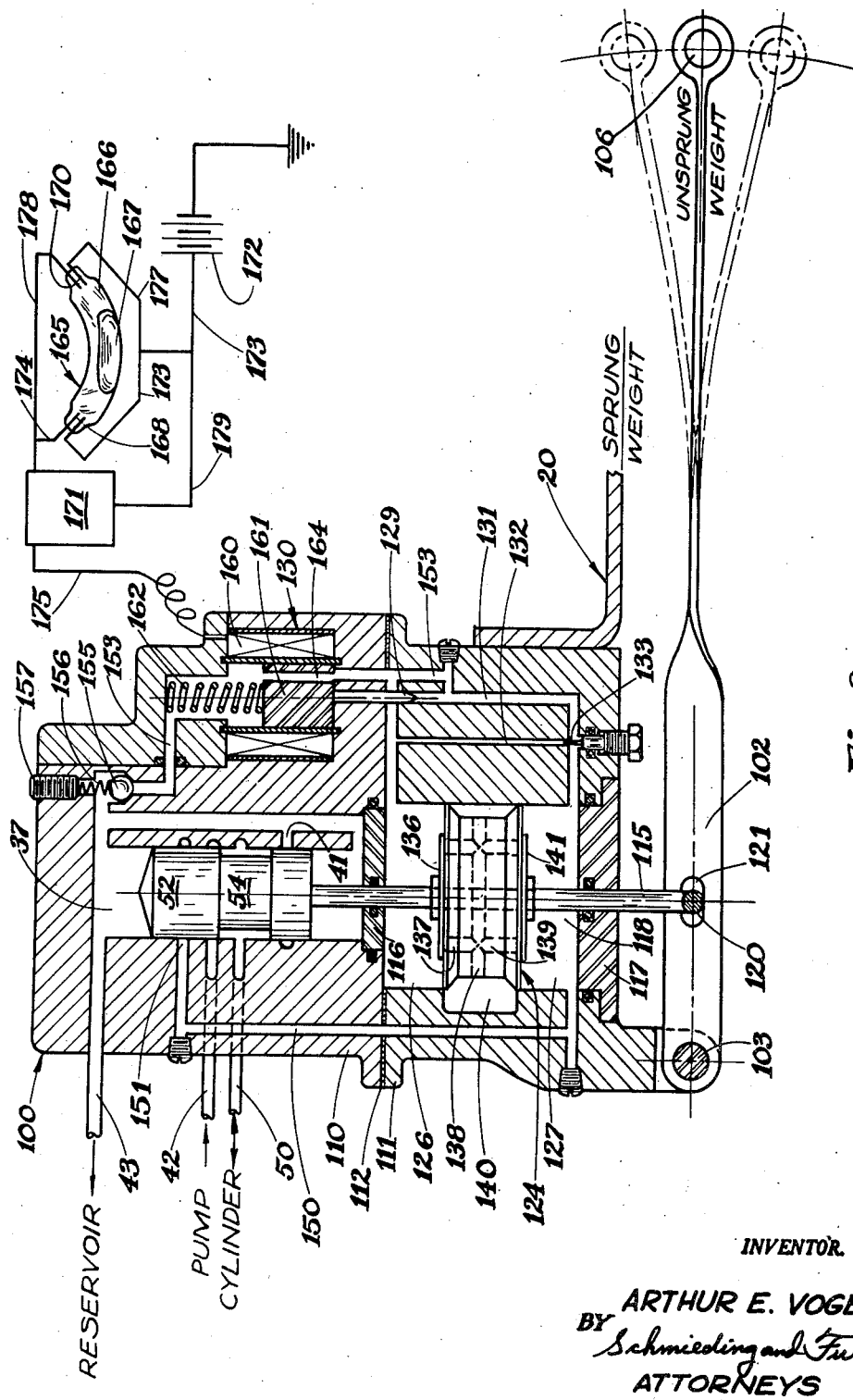

May 29, 1962     A. E. VOGEL     3,036,844
APPARATUS FOR CONTROLLING VEHICLE SUSPENSION
Filed April 12, 1956     7 Sheets-Sheet 5

INVENTOR.
ARTHUR E. VOGEL
BY Schmieding and Fultz
ATTORNEYS

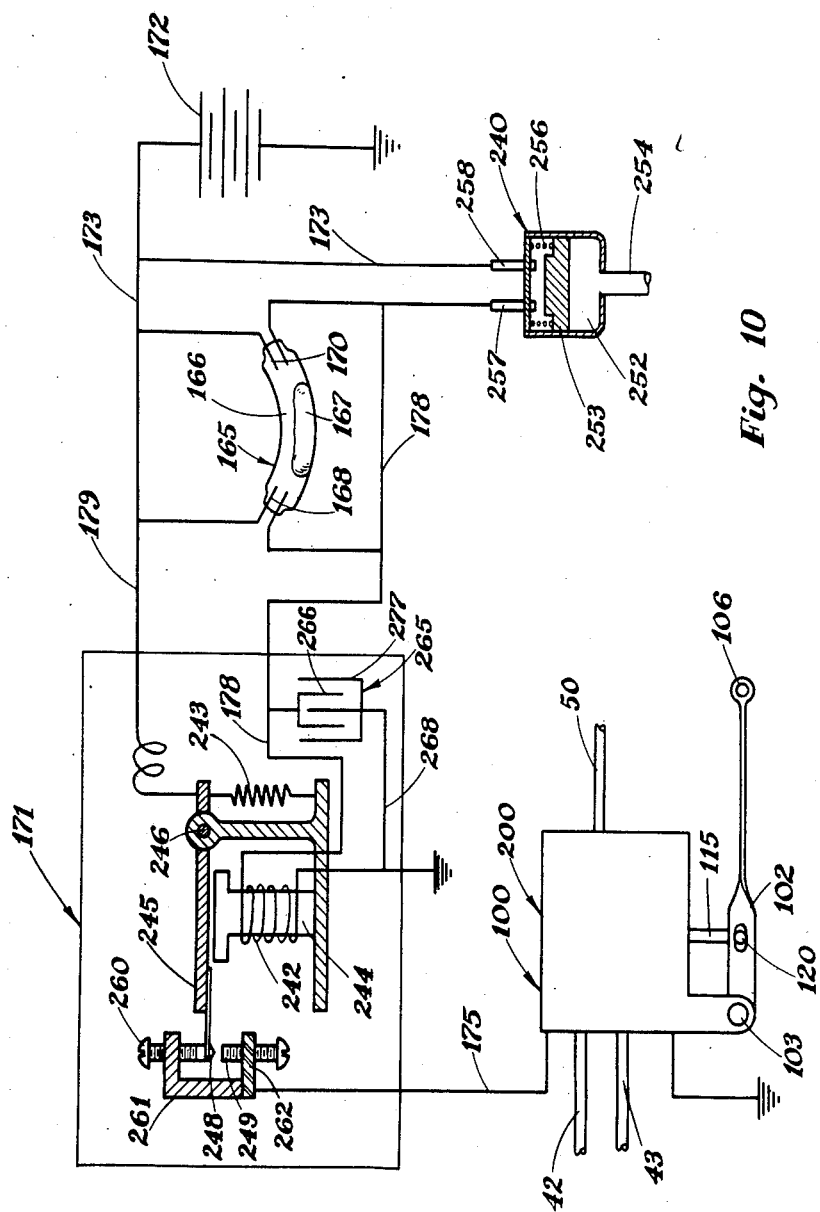

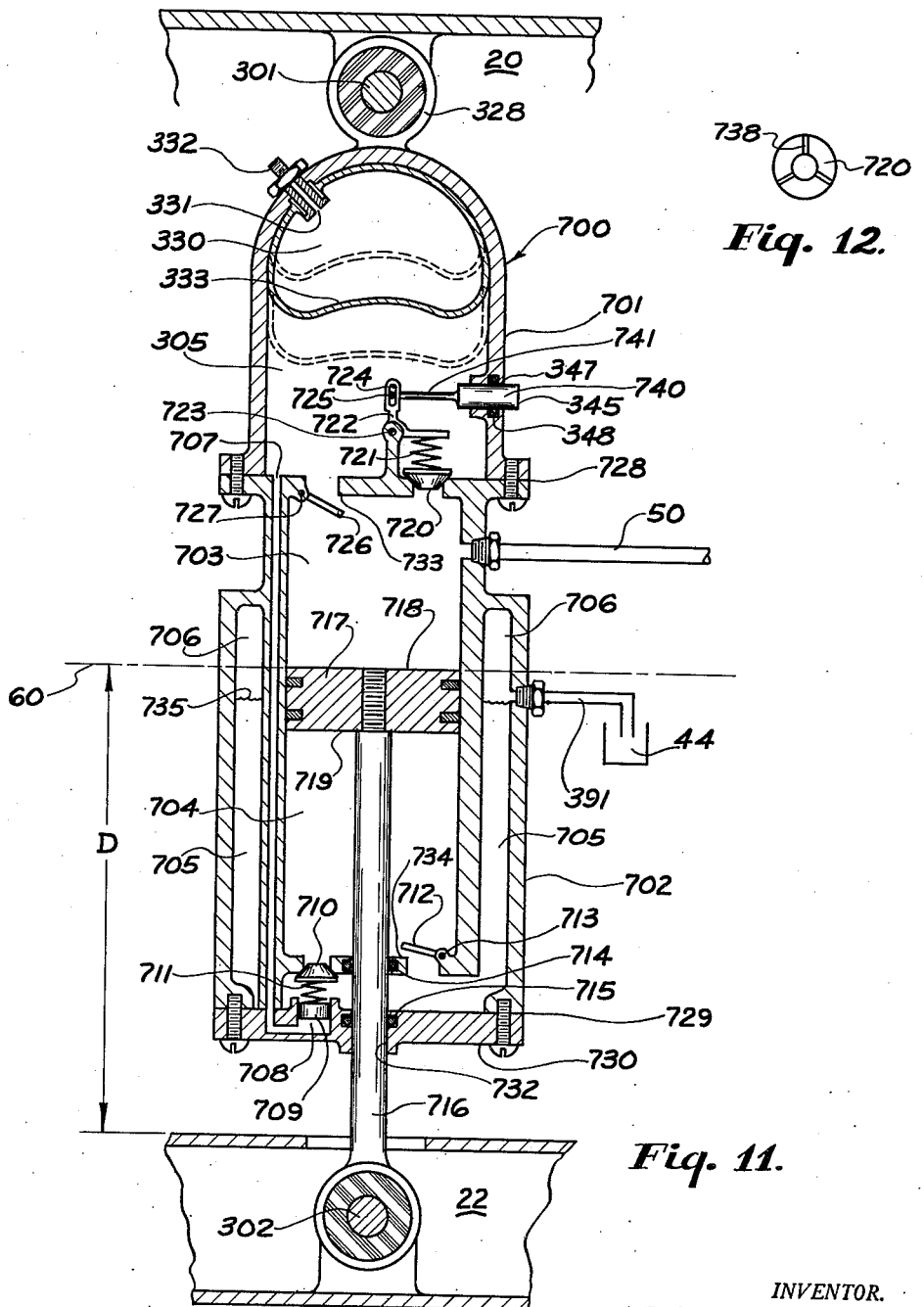

United States Patent Office 3,036,844
Patented May 29, 1962

3,036,844
APPARATUS FOR CONTROLLING
VEHICLE SUSPENSION
Arthur E. Vogel, Columbus, Ohio, assignor, by direct and mesne assignments, of one-half to Dawson-Vogel Engineering Company, one-fourth to Warren H. F. Schmieding, and one-fourth to Palmer Fultz, Columbus, Ohio
Filed Apr. 12, 1956, Ser. No. 577,777
35 Claims. (Cl. 280—124)

The present invention relates to suspension system for vehicles and more particularly to a novel apparatus for automatically controlling such systems.

This application relates to improvements in systems of the type disclosed in co-pending applications Serial Number 519,079, now abandoned, and Serial Number 541,337 of Arthur E. Vogel.

In general, the present apparatus is applied to motor vehicles of the type which comprise a sprung weight portion supported by four unsprung weight portions each of which includes a wheel and an independent spring means. The apparatus of the present invention includes a separate control means for each of said spring means arranged to increase and decrease the force exerted by each spring means independently of the other spring means. In addition, each control means is provided with a separate detector means adapted to sense relative movement, from a predetermined suspension configuration, between the sprung and unsprung portions at the particular spring means being controlled.

When the vehicle encounters inertia forces in negotiating a curve, the spring means towards the center of the curve normally unload stored spring energy in a manner which is detrimental to stability and consequently dangerous to the occupants. With the present invention applied, however, the previously mentioned detector means sense any tendency for the inner side of the sprung weight portion of the vehicle to move upwardly from the inner unsprung weight portions such as occurs when the sprung weight portion of a vehicle tends to lean outwardly in a curve. When such tendency is sensed, the appropriate control means are rapidly and automatically actuated, in a controlled manner, to decrease the upwardly directed force exeerted by the spring means at the side towards the center of the curve being rounded. Moreover, the appropriate detector means sense the magnitude of relative movement between the sprung and unsprung portions, and command the respective control means to decrease the force exerted by an appropriate amount to maintain said sprung and unsprung portions at said predetermined relative configuration under the various magnitudes of a centrifugal force to which the vehicle is subjected.

As one aspect of the present invention, novel suspension systems are provided which incorporate novel fluid actuated means with the above described control means whereby such suspension systems function in an improved manner. The combined operation of said control means and novel mechanism in said fluid actuated means effects, in a novel manner, automatic variations in the rate of the spring means of the vehicle with such variations being effected in proportion to variations in force or load being imposed on the spring means of the vehicle.

As another aspect of the present invention, novel suspension systems are provided which incorporate novel fluid actuated means with the above described control means. Such fluid actuated means include novel shock absorber mechanism providing variable resistance to movement between the sprung and unsprung weights of the vehicle. Such resistance to movement is automatically varied in magnitude with such variation being effected in proportion to variations in the static and dynamic loading to which the vehicle is being subjected.

As another aspect of the present invention, both of the mechanisms described in the preceding two paragraphs are combined in a single hydraulic-pneumatic unit and incorporated in a novel system comprising the above described control means. Hence both variations in spring rate and variations in shock absorber resistance are provided by a compact and economical unit adapted to levelize the vehicle both under variations in static loading and horizontally imposed inertia forces.

In addition to the above described advantages, the present novel systems incorporate time delay mechanism of the type disclosed in the above mentioned co-pending application Serial Number 541,337 for effecting a time lag in the response of said control means to said detector means when normal straight road conditions are being encountered. Accordingly, when road-imposed impacts are encountered at a particular spring means, the unsprung weight portion thereat will depart upwardly and downwardly and effect movements of short time duration without effecting any substantial change in the force exerted by the spring means. When the vehicle is entering a curve, however, it is desirable to effect rapid response of the control means to inertia forces so as to achieve roll stability without the presence of an undesirable transition period at curve entry. Such undesirable transition period would occur, at the time of curve entry, if the above mentioned time delay were retained operative when centrifugal forces are encountered since then the vehicle would start to roll or lean prior to a delayed action of the control means. Accordingly, the above mentioned time delay, required to prevent actuation of the control means when road imposed impacts are encountered, in straight road operation, is automatically rendered inoperative when the vehicle encounters centrifugal forces in entering a curve. Hence the control means will rapidly apply anti-roll corrections at the time of curve entry by the vehicle, yet such control means is non-sensitive to road imposed impacts.

As an additional advantage of the invention, when the vehicle is subjected to various degrees and distributions of static loads, the detector and control means at each of the independent spring means effect an appropriate sensing and produce a corresponding controlled variation in the force exerted by each spring means to maintain said predetermined suspension configuration at all the spring means of the vehicle and for all magnitudes and distributions of static load to which the vehicle is subjected.

Further objects and advantages of the present invention will be apparent from the following description, reference being had to the accompanying drawings wherein a preferred form of embodiment of the invention is clearly shown.

In the drawings:

FIGURE 2 is a front view partially in section, of a hydraulic-pneumatic means constructed according to the present invention and comprising a portion of the system of FIGURE 1. The section is taken along a vertical plane through the center line of such pneumatic-hydraulic means;

FIGURE 3 is a bottom view of a flow restricter utilized in the mechanisms of FIGURES 2 and 5;

FIGURE 4 is a top view of a second flow restricter utilized in the mechanisms of FIGURES 2 and 5;

FIGURE 7 is a side sectional view of a second control means for controlling the flow of a compressible fluid such as air, with such control means comprising a portion of the system of FIGURE 5. The section is taken substantially along a vertical plane through the housing of the control means;

FIGURE 10 is a diagrammatic view of the electrical circuit and holding relay of FIGURE 1;

FIGURE 11 is a front view, partially in section, of a third hydraulic-pneumatic means constructed according to the present invention and comprising a third aspect thereof. The section is taken along a vertical plane through the center line of such third hydraulic-pneumatic means; and FIGURE 12 is a bottom view of one of the flow restrictors comprising a portion of the hydraulic-pneumatic means of FIGURE 11.

Figure 1:
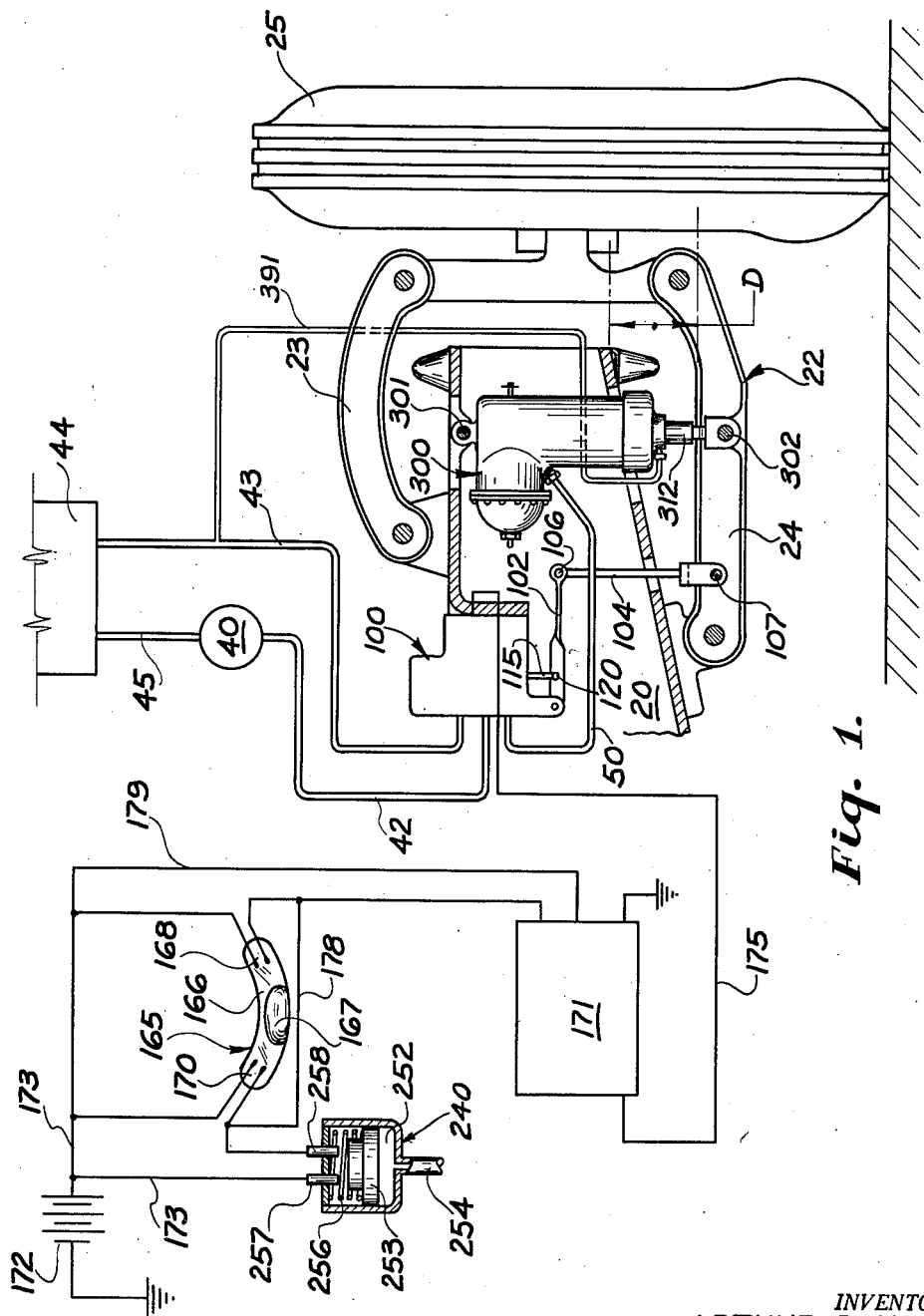
FIGURE 1 is a front schematic view showing the suspension system of a motor vehicle with a control system constructed according to the present invention applied thereto.

Referring first to the control system of FIGURES 1 and 2 of the drawings, such system is schematically illustrated as being applied to a motor vehicle which includes a sprung weight portion 20 supported by four unsprung weight portions each of which includes a wheel. The left front unsprung weight portion is indicated generally at 22 and comprises an upper control arm 23, a lower control arm 24, and a wheel 25.

A hydraulic-pneumatic means is indicated generally at 300 and shown connected between sprung weight 20 and unsprung weight 22 at the pivots 301 and 302, respectively.

As seen in FIGURE 2, the hydraulic-pneumatic means 300 includes a casing 303 which forms chambers 305, 306, and 307 for receiving hydraulic fluid from a pump 40 via line 42, a control means 100 and line 50. Hydraulic fluid is also exhausted from chamber 305 via line 50, control means 100 and line 43 to a reservoir 44. The intake of pump 40 receives fluid from reservoir 44 via a line 45.

Control means 100 is illustrated in detail in FIGURE 6 and described later herein, but at this point it should be pointed out that control means 100 serves to deliver pressurized fluid to or release pressurized fluid from chamber 305 as may be required to maintain a predetermined normal configuration distance D between the sprung and unsprung weight portions 20 and 22. Such distance D is maintained for all variations in static and dynamic loads to which the vehicle is subjected.

As seen in FIGURE 2, hydraulic-pneumatic means 300 includes a piston 310 slideably carried by cylinder 311. Piston rod 312 extends to the exterior of the casing through a hole 313 in removable cover 314. A high pressure fluid seal 315 and a low pressure fluid seal 392 are provided with an annular drain passage 390 intermediate said two seals. A line 391 serves to return to reservoir any fluid that may leak past high pressure fluid seal 315. A wiper 316 protects seals 315 and 392 from dirt and abrasion.

The piston 310 divides cylinder 311 into upper chamber 306 and lower chamber 307. Upper chamber 306 communicates with chamber 305 via passages 318 and 319 and lower chamber 307 communicates with chamber 305 via passages 321, 322, and 323.

Due to the presence of rod 312 in lower chamber 307, pressurization of chambers 305, 306, and 307 will tend to extend rod 312 relative to casing 303. This is true since with equal hydraulic pressure in chambers 306 and 307, the greater area of upper surface 325 of the piston, as compared to the lower surface 326 thereof, the fluid will exert a force between casing 303 and rod 312. Since casing 303 is connected to the sprung weight at connector 328 and rod 312 is fastened to the unsprung weight at 302, it will be understood that such force exerted at each of the four wheels supports the entire sprung weight of the vehicle.

The casing 303 further includes a chamber 330 containing a compressible fluid such as air which can be introduced or released at a passage 331 provided with a shut-off valve 332. Chamber 330 includes a moveable wall 333 that separates the gas in chamber 330 from the hydraulic fluid in chamber 305. Chamber 330 is shown formed by a closed flexible bag which may be fabricated of synthetic rubber or the like, with such bag being installed in casing 303 at a removable cover 365 provided with a gasket 366 and retained in place by screws 367.

The compressible fluid, such as air, in chamber 330 provides the spring action between sprung and unsprung weights of the vehicle since upward movement of rod 312 will expel fluid from chamber 306 to chamber 305 at a greater rate than chamber 307 can take in fluid from chamber 305. Hence moveable wall 333 will move to the left, as seen in FIGURE 2, and the gas in chamber 330 will be compressed. It will be understood that control means 100 always maintains the appropriate fluid pressure in chamber 305 required to maintain piston 310 at a normal configuration datum 60 at which the sprung and unsprung portions 20 and 22 are maintained at the previously mentioned distance D apart. Hence it is seen that when the static weight of the vehicle is increased, additional fluid is delivered to chamber 305 by control means 100 and flexible wall 333 will move to the left. The gas in chamber 330 is thereby compressed and the spring rate, or amount of force exerted per unit of deflection is increased. Conversely, when the static weight of the vehicle is decreased the flexible wall 333 will move to the right and the spring rate provided by resilient chamber 330 will decrease.

With continued reference to FIGURE 2, shock absorber action for the hydraulic-pneumatic means 300 is provided by a flow restrictor 335, for the up-stroke, and a second flow restrictor 336 for the down-stroke. Both flow restrictors 335 and 336 are urged toward normally closed positions, illustrated, by springs 338A and 338B respectively, and may be provided with grooves 340 and 341, respectively, that form normal flow orifices past the closed seats of the flow restrictors with their respective passages. Such grooves 340 and 341 are illustrated in the end views of the flow restrictors 335 and 336 provided by FIGURES 3 and 4, respectively.

The restriction to fluid flow past the flow restrictors 335 and 336 is automatically varied in proportion to the magnitude of the road-imposed impacts, and also in proportion to the static and inertia loads imposed on the particular hydraulic-pneumatic means 300, by a moveable spring loader indicated generally at 344. Spring loader 344 is constantly urged toward the right by fluid pressure in chamber 305 due to area of end surface 345 being subjected to only atmospheric pressure which is of less value. To achieve this a rod portion 346 slideably extends through a hole 347 provided with a fluid seal 348. Spring loader 344 is constantly urged to the left by a preloaded compression force of springs 338A and 338B being exerted on spring retainers 350A and 350B which in turn exert force on the inclined wall surface 351 of the spring loader 344.

When the fluid pressure in chamber 305 is increased, either by the introduction of fluid to chamber 305 via line 50, which occurs when static or inertia loads increase, or by upward movement of rod 312, which occurs when road-imposed impacts are encountered, then in either or both instances spring loader 344 is shifted to the right as seen in FIGURE 2. This action moves spring retainers 350A and 350B apart and increases the compression force exerted by springs 338A and 338B. Hence it is seen that the restriction to fluid flow exerted by flow restrictors 335 and 336 is automatically increased in proportion to the increase in the magnitude of the static, inertia, or impact loads being encountered. Conversely, when the fluid pressure in chamber 305 for any reason decreases, spring loader 344 moves to the left, as seen in FIGURE 2, whereby the restriction to fluid flow exerted by flow restrictors 335 and 336 is automatically decreased in proportion to the decrease in magnitude of the static, inertia, or impact load being encountered.

With continued reference to FIGURE 2, a check valve 355 is provided in passage 319 for the flow of fluid from chamber 305 to chamber 306, and a second check valve 356 is provided in passage 323 for the passage of fluid from chamber 305 to chamber 307. Check valves 355 and 356 effect unidirectional flow whereby fluid being expelled from either of the chambers 306 or 307 is forced to encounter the flow restrictors 335 or 336. Check valves 355 and 256 are each closed by a spring 358 of light force so that the check valves can readily open when the suspension oscillates. Hence chambers 306 and 307 will at all times be full of hydraulic fluid whereby cavitation is prevented.

As seen in FIGURE 2, a threaded plug 370 is provided in an air bleed passage 371 whereby air can be bled from the hydraulic fluid of the system.

It will be noted that in the hydraulic-pneumatic means 300, illustrated in FIGURES 1 and 2, the spring loader 344 is shown exposed to the fluid in chamber 305 whereby springs 338A and 338B are loaded or released in proportion to the increase or decrease in the pressure of the hydraulic fluid in chamber 305.

It should be pointed out that in FIGURE 2 the high pressure line 50 leading from control means 100 is shown connected to chamber 305. This constitutes a preferred arrangement since any pressure increases or decreases, caused by delivery or release of fluid by control means 100, will be simultaneously imposed on both flexible wall 333 and spring loader 344 without the necessity of passing fluid through any of the flow restrictors.

Figure 5:
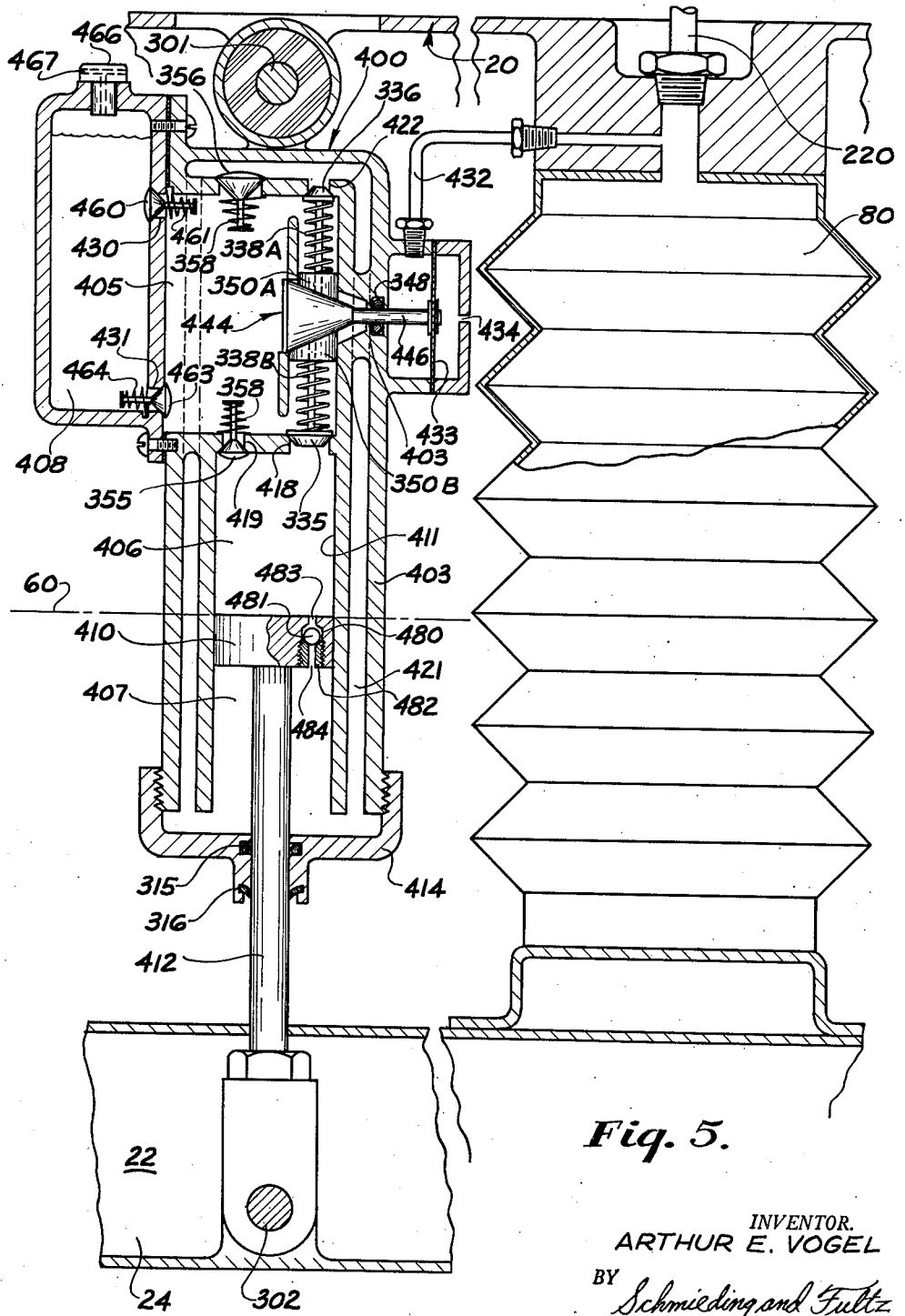
FIGURE 5 is a front view, partially in section, of a second hydraulic-pneumatic means constructed according to the present invention and comprising a second aspect thereof. The section is taken along a vertical plane through the center line of such second hydraulic-pneumatic means.

Reference is next made to FIGURE 5 which illustrates another hydraulic-pneumatic system which includes a controlled shock absorber unit 400 and an expendable and contractable container forming a controlled variable pressure air chamber 80 formed by a flexible casing connected between the sprung weight 20 and unsprung weight 22 of a vehicle. A compressible fluid such as air is maintained in chamber 80 whereby such chamber forms one of the spring means of the vehicle.

Figure 7:
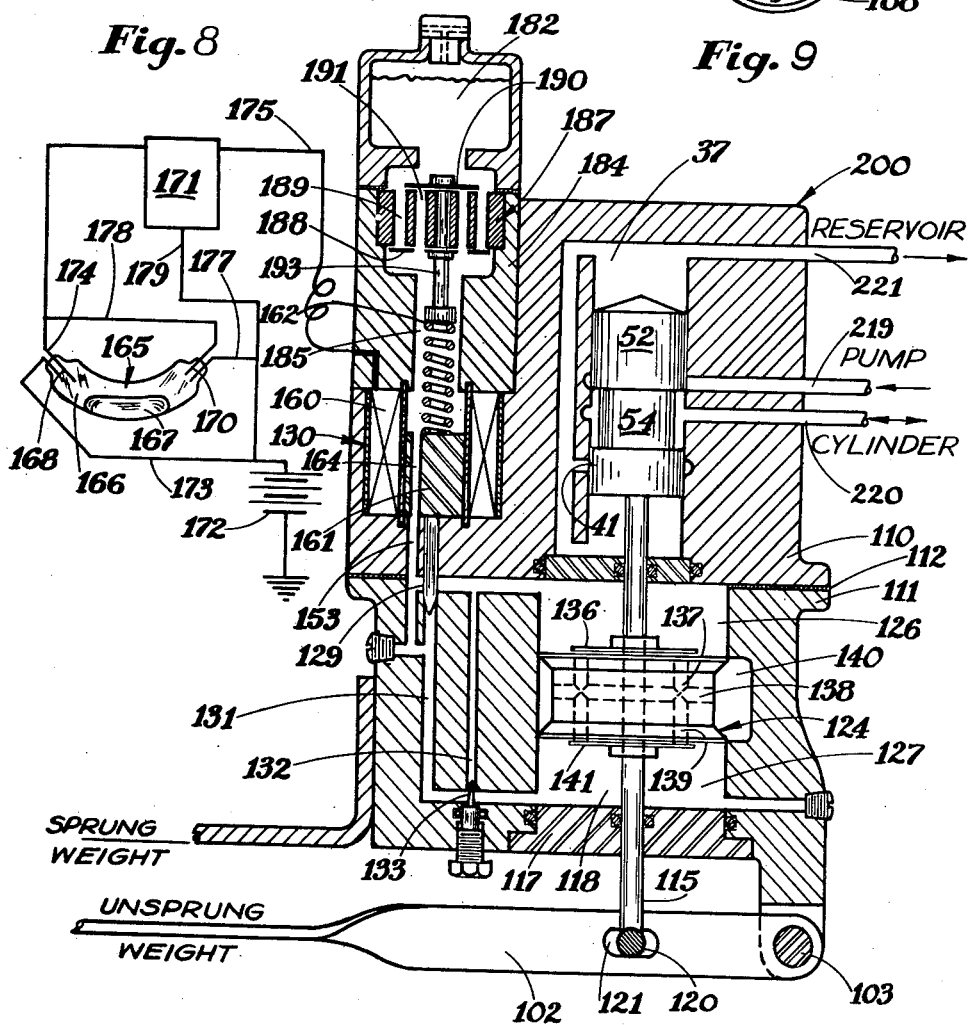
FIGURE 7 is a side sectional view of a control means comprising a portion of the system of FIGURES 1 and 2. The section is taken substantially along a vertical plane through the housing of said control means.

The chamber 80 receives pressurized air through a line 220 leading to a control means 200 illustrated in detail in FIGURE 7 and fully described later herein. Control means 200 in turn receives pressurized air from an air pump, not illustrated, via the line 219 seen in FIGURE 7. Chamber 80 expels air via line 220, control means 200, and line 221 leading to a reservoir as indicated in FIGURE 7. As will later be described, control means 200 serves to vary the pressure in chamber 80 so as to maintain a predetermined normal configuration distance D between sprung weight portion 20 and unsprung weight portion 22 for all static and inertia loads to which the vehicle may be subjected.

As seen in FIGURE 5, the controlled shock absorber unit 400 includes a casing 403 which forms chambers 405, 406, and 407 to which hydraulic fluid is supplied from a reservoir 408. A piston 410 and piston rod 412 are mounted for reciprication in a cylinder 411. Due to the presence of the volume of rod 412 in lower chamber 407, upward movement of piston 410 expels hydraulic fluid through passage 418 to chamber 405. Chamber 405 in turn expels fluid through a passage 430 to reservoir 408. When piston 410 moves downwardly, chamber 407 expels fluid through passages 421 and 422 to chamber 405. Fluid will also pass from chamber 405 through passage 419 to chamber 406 as piston 410 moves downwardly. Since more fluid must be supplied to chamber 406 than is expelled from chamber 407, reservoir 408 supplies the deficiency through passage 431 connecting such reservoir with chamber 405.

With continued reference to FIGURE 5, the hydraulic-pneumatic system includes a controlled shock absorber unit 400 provided with variable shock absorber mechanism similar to the type previously described in connection with the apparatus of FIGURE 2 but differing therefrom in that a moveable spring loader 444 is provided with a flexible diaphragm 433 connected to a rod piston 446 extended through a hole in casing 403. As seen in FIGURE 5, one side of diaphragm 433 is exposed to atmosphere at 434 and the other side of the diaphragm is exposed to the pressure of the compressible gas in chamber 80 by means of a line 432.

The flow restrictors 335 and 336, check valves 355 and 356, springs 338A and 338B and spring retainers 350A and 350B function in the manner previously described in connection with the apparatus of FIGURE 2.

Although FIGURE 5 illustrates a hydraulic-pneumatic system, it will be understood that the flexible casing forming air chamber 80 could be replaced by other spring means such as a coil spring or torsion bar. In such instance, the system would be hydraulic-mechanical. For example, a steel coil spring and fluid chamber can be placed in series between the sprung and unsprung weights in a manner illustrated in the previously mentioned copending application Serial Number 541,337. Such spring and fluid chamber are illustrated at 32 and 47, respectively, in FIGURE 6 of such application. The fluid in such chamber, at the coil spring termination, would be placed in communication with the fluid in reservoir 408 of unit 400 of FIGURE 5 with such reservoir being sealed, or the fluid in such chamber would be placed in communication with diaphragm 433 of unit 400 of FIGURE 5. In both of such modifications of FIGURE 5 the magnitude of shock absorber resistance would be varied in proportion to the magnitude of force being imposed on the spring means at the particular time.

In the unit 400 of FIGURE 5, and also the unit 300 of FIGURE 2, means are provided to prevent entrapment of air beneath piston 410 or 310 and the systems are made self-bleeding by the provision of a passage 480 through the pistons. Passage 480 includes a plug 482 forming a restricted air inlet 484. A restricted air outlet 483 is provided at the top of the passage. Such inlet and outlet form upper and lower seats for valve element 481. Upon oscillation of the piston, valve element 481 is alternately fluid biased from one seat to the other. It will be understood that air and fluid will work through passage 480 when valve element 481 is between its seats during oscillation of the piston. The quantity of fluid passed through passage 480 is minute but the entrapped air is automatically exchanged from chamber 407 to chamber 406, through valve 335, chamber 405, flow restrictor 460, reservoir 408, and vent 467 to atmosphere. In FIGURE 2, air is exchanged from chamber 307 to chamber 306, through valve 335, to chamber 305 and can be released at bleed screw 370.

In operation of the system of FIGURE 5, when the pressure in chamber 80 of the air spring increases, diaphragm 433 and spring loader 444 will move to the right, as seen in FIGURE 5 and the compression in springs 338A and 338 B is automatically increased in proportion to the magnitude of the increase in load to which the vehicle is subjected. Hence the restriction to fluid flow provided by restrictors 335 and 336 is increased to automatically increase the shock absorber effect in proportion to the increased static, inertia, or impact, load being encountered. When the pressure in chamber 80 is for any reason decreased, diaphragm 433 and spring loader 444 are moved to the left, as seen in FIGURE 5, whereby the restriction to fluid flow presented by flow restrictors 335 and 336 is automatically decreased in proportion to the decrease in the magnitude of the static, inertia, or impact load being encountered.

As seen in FIGURE 5, the previously mentioned passage 430 is provided with a flow restrictor 460 constantly urged towards closure by a spring 461. Such flow restrictor 460 produces pressure in chamber 405 on the up-stroke of rod 412 so that fluid will be driven rapidly through check valve 356 and passage 421 to chamber 407. Hence chamber 407 will always be maintained full whereby cavitation is prevented when the piston 410 oscillates. It will be noted that spring 461 of flow restrictor 460 should be stronger than spring 358 of check valve 356. As additional anti-cavitation means the passage 431 includes a lightly biased check valve 463 which is urged towards closure by a light spring 464. Hence check valves 463 and 355 can readily dump fluid into chamber 406 when piston 410 and rod 412 move downwardly relative to casing 403.

The reservoir 408 is provided with a filler cap 466 which includes an air vent passage 467.

As seen in FIGURE 6, control means 100 includes an upper casing portion 110 joined to a lower casing portion 111 at a sealed junction 112.

Control means 100 further includes a spool 52 slidably fitted in a cylinder 37 and provided with a necked portion 54. When spool 52 moves upwardly, a source of high pressure, such as pump 40 of FIGURE 1, delivers fluid through lines 42 and 50 to chamber 305 of hydraulic-pneumatic means 300, FIGURE 1, since line 42 is then connected to line 50 by necked portion 54 of the spool.

When spool 52 moves downwardly from the position illustrated in FIGURE 6, chamber 305 of hydraulic-pneumatic means 300, FIGURE 1, is connected with reservoir 44 since the port 41, and hence the line 43, are connected to line 50 by the necked portion 54 of the spool.

When spool 52 is in the normal position illustrated in FIGURE 6, which is the case when no correction for static or inertial load variation is being made by the control means, then the chamber 305 of hydraulic-pneumatic means 300 is isolated from both pump 40 and reservoir 44, and the pump and reservoir are isolated from each other, since spool 52 is then effecting isolation of the lines 42, 43, and 50 one from the other.

With continued reference to control means 100, spool 52 is connected to resilient arm 102 by a rod 115 which rod extends slidably through an upper removable wall 116 and a lower removable wall 117 of a chamber 118. The lower end of rod 115 is pivotally and slidably connected to resilient arm 102 by a pin 120 extended through a slot 121.

A valve movement retarding means, indicated generally at 124, is mounted on rod 115 and in sealed sliding engagement with the inner wall of chamber 118.

Retarding means 124 is illustrated in FIGURE 6 in the normal position it occupies when the suspension system is in a normal configuration shown in FIGURE 1 in which configuration the sprung weight 20 is a normal static load distance D from the unsprung weight 22 and the spool 52 is effecting isolation of lines 42, 43, and 50 one from the other.

When retarding means 124 is urged upwardly or downwardly, from the normal position illustrated, fluid will be moved from an upper chamber portion 126 to a lower chamber portion 127, or from lower chamber portion 127 to upper chamber portion 126, respectively. So long as element or needle valve 129 of a time delay valve 130 closes passage 131, as illustrated in FIGURE 6, fluid moving between chamber portions 126 and 127 must pass through a passage 132 provided with a restrictor 133 which may be formed as an adjustable threaded needle valve 133 carried by lower casing 111 and extended into the lower end of passage 132. It will be understood that the rate of movement of retarding means 124, either upwardly or downwardly from the normal position illustrated, is much slower when the element 129 is closing the larger passage 131 since, in such instance, the flow rate of fluid between chamber portions 126 and 127 is throttled by the restrictor 133. When element 129 of time delay valve 130 is removed from passage 131, however, the fluid can rapidly move between the chamber portions 126 and 127 and the retarding means 124, and spool 52 connected thereto, can move rapidly whereby corrections are rapidly instituted by control means 100.

When the time delay mechanism is operative, and rapid movement of retarding means 124 away from the normal position is prevented, then the resilient arm 102 will bend upwardly or downwardly with rapid relative movement between the sprung and unsprung weight portions, yet when one of such relative movements is retained for a time duration greater than the time delay of the system then such arm provides the necessary force for continuing the movement of retarding means 124 at the slow rate it must move when time delay valve 130 is closing passage 131. Hence it is seen that the resilient arm 102 allows rapid relative movement between sprung and unsprung weight portions 20 and 22 at times when movement of retarding means 124 is retarded and cannot follow such rapid relative movements. Accordingly, the control means is rendered inoperative when road imposed impacts of short time duration are encountered. When the vehicle encounters a static load change of relative long time duration, however, such as occurs when the number of passengers is increased or decreased, the resilient arm 102 will bend and continue to bias the retarding means 124 until slow movement thereof moves spool 52 to the appropriate position for the correction required to return the sprung and unsprung weight portions 20 and 22 to the normal configuration at which they are spaced a distance D apart.

When retarding means 124 is urged upwardly by resilient arm 102, as will occur when sprung weight 20 including casings 110 and 111 moves downwardly relative to unsprung weight 22, an upper resilient valve member 136 is maintained closed by fluid pressure whereby fluid cannot pass through the passages 137, 138, or 139 to lower chamber 127. Hence fluid is moved either through restricted passage 132 or through both the restricted passage 132 and the larger passage 131 depending on whether or not time delay valve 130 is open or closed.

After retarding means 124 has been moved upwardly, either rapidly or slowly depending on whether or not the time delay valve 130 is open or closed, such retarding means 124 will always move rapidly back to the normal position illustrated, after a correction has been made by the control means. Such rapid return of the retarding means 124 occurs when such retarding means is returning to the central position illustrated since the recess 140 is then in communication with lower chamber portion 127 whereby fluid pressure in such lower chamber portion 127 and recess 140 opens the resilient valve member 136 and fluid can pass readily through passages 137 and 138 and into upper chamber portion 126. Since the cross-sectional areas of passages 137 and 138 are much greater than the effective cross-sectional area of passage 132 at restrictor 133, the fluid transferred between chamber portions 127 and 126 will not slow down movement of the casings 110 and 111 when such casings are returning from a lower position until they reach the normal position illustrated and closes by-pass recess 140.

When retarding means 124 is urged downwardly by resilient arm 102, as would occur when the sprung weight 20 rises relative to unsprung weight 22, then the lower resilient valve member 141 will be maintained closed by fluid pressure and fluid will pass from lower chamber portion 127 to upper chamber portion 126 either through the restricted passage 132 or through both the restricted passage 132 and the larger passage 131 depending on whether the element 129 of time delay valve 130 is in the closed or open position. It will be noted that when element 129 of the time delay valve is in the closed position, illustrated in FIGURE 7, such element closes both the vertical portion of larger passage 131 and the upper horizontal portion of such passage which leads to upper chamber 126. Hence fluid can pass between the chambers only via restricted passage 132.

Retarding means 124 will return rapidly from a lower position to the normal position illustrated since upper chamber portion 126 is then in communication with recess 140 whereby fluid pressure opens resilient valve member 141 and fluid can pass directly through the passages 138 and 139 and into the lower chamber portion 127 without being forced through the restricted passage 132 until retarding means 124 closes by-pass recess 140.

When retarding means 124 arrives at the normal position illustrated, at the completion of a return movement after a correction has been made, the side of retarding means 124 forms a closure for recess 140 in the manner illustrated in FIGURE 6.

It is desirable to provide a circulating supply of fluid through upper and lower chamber portions 126 and 127 to keep the system free of dirt as well as to remove air from the system. It is not necessary that the volumetric rate of such circulation be great but is is desirable to provide some positive pressurized flow. Accordingly, a passage 150 is provided with an inlet port 151 confronting the outer surface of spool 52. The other end of passage 150 leads to the lower chamber portion 127. Since inlet port 151 is located intermediate the high pressure pump line 42 and the low pressure portion of cylinder 37, which portion is at reservoir pressure, and since a certain small volume of fluid will always leak along the confronting walls of spool 52 and cylinder 37, such fluid leakage will enter port 151 and flow through passage 150 to the lower chamber portions 126 and 127. To complete the circuit a return passage 153 is prvoided, with such passage leading from the passage 131 back to the portion of the interior of cylinder 37 which is at reservoir pressure. The outlet end of passage 153 is provided with a fluid actuated check valve 155 which opens at a predetermined pressure against the action of spring 156. A screw 157 is provided for varying the relief pressure at which check valve 155 opens, with such relief pressure being set at some value less than the fluid pressure at inlet port 151 of inlet passage 150 in order to provide the desired circulation through the time delay portion of the system.

It will be understood that the pressure available for pressurizing chambers 126 and 127 will depend on the location of port 151 relative to the distance between pressurized line 42 and the top of spool 52 which is exposed to reservoir pressure. If the port 151 is centrally located between line 42 and the top of spool 52, and if the reservoir pressure is atmospheric, then the pressure available at port 151 will be approximately one half the pressure existing in high pressure line 42.

Referring next to the time delay control valve 130 of FIGURE 6, such valve includes a stationary solenoid 160 surrounding a moveable core 161 which core carries element or needle valve 129. A spring 162 constantly urges core 161 and element 129 towards the closed position illustrated. When solenoid 160 is energized, however, core 161 is moved upwardly by the magnetic field of the solenoid towards a central position therein whereby the element 129 opens the larger passage 131 and the time delay mechanism is rendered inoperative in the manner previously described.

A passage 164 is provided through core 161 for the passage of fluid through the core whereby both the upper and the lower end of the core are subjected to the same fluid pressure. Hence the time delay control valve 130 is balanced with respect to fluid pressure of the system and movements thereof will be effected only by the action of spring 162 and solenoid 160.

The system of FIGURE 6 is provided with an inertia responsive control means to rapidly render the time delay mechanism inoperative when the vehicle is suddenly subjected to a horizontally exerted inertia force such as is the case when the vehicle enters a curve, or at the outset of a braking or accelerating operation. In these instances of vehicle operation it is desirable to rapidly institute an anti-roll correction at the entry of a curve, or to rapidly resist longitudinal pitching or "nose dive" of the front of the vehicle when the brakes are applied, or to rapidly resist longitudinal pitching of the vehicle during rapid acceleration thereof. By rapidly instituting the correction to be made by the control means, through rendering inoperative the time delay mechanism, lower control means pressures are required to effect stability and the passengers of the vehicle will not be subjected to unpleasant transition sensations as would be the case were the vehicle permitted to materially proceed into a roll or pitching movement before the appropriate correction is instituted by the control means 100.

With continued reference to FIGURE 6, a horizontally disposed mercury switch is generally indicated at 165. Such switch includes a tube 166 having inclined opposite ends provided with a first pair of contacts 168 and a second pair of contacts 170. A source of electric energy 172 is connected to one of the contacts 168 by wire 173 and the other of the contacts 168 is connected by wire 174 to a holding relay 171, illustrated in FIGURE 6 and later to be described herein, which relay is in turn connected to solenoid 160 by the wire 175. At the other end of tube 166 one of the contacts 170 is connected to the source of electric energy 172 by the wire 177 and the other of the contacts 170 is connected to the holding relay by the wire 178.

When the quantity of mercury 167 connects either the contacts 168 or the contacts 170 the solenoid 160 is actuated whereby the time delay mechanism is rendered inoperative. It will be understood that when the longitudinal axis of mercury switch 165 is disposed transversely to the longitudinal axis of the vehicle the mercury switch 165 will sense centrifugal force and render inoperative the time delay mechanism when the vehicle encounters a curve.

The same control means 100 can be also utilized to control longitudinal pitching or "nose dive" of the vehicle when the brakes are applied in slowing down or stopping. In such instances it is desirable to render inoperative the time delay mechanism of control means 100 so that an anti-pitch correction will be rapidly instituted before the vehicle has materially progressed into a pitched attitude. To accomplish this a brake operated switch 240, illustrated in FIGURE 1, and later to be described, may be connected in parallel with the mercury switch 165. Hence a single control circuit, using both mercury switch 165 and brake operated switch 240, can be utilized with control means 100 whereby such control means 100 will effect both anti-roll corrections and anti-pitch corrections.

Reference is next made to FIGURE 7 which illustrates a control means 200 adapted for use in a control for the suspension system of FIGURE 5 wherein a compressible fluid, such as air, is utilized. In general, the control means 200 is adapted to vary the fluid pressure in a sealed flexible casing or air spring such as the casing or chamber 80 shown in FIGURE 5.

The control means 200 functions to control the vehicle in substantially the same manner as control means 100 previously described. The structure of control means 200 differs, however, from that of control means 100, since, in the former the main valve mechanism, provided by spool 52, is used to regulate air and the retarding means 124 is operated in hydraulic liquid in chamber 118. Accordingly, in control means 200, the cylinder 37 must be completely sealed from the hydraulic chamber 118. Moreover, a hydraulic reservoir 182 is added to control means 200 to maintain fluid in the hydraulic chamber 118. Hence the air, used as the control fluid, is prevented from leaking into the hydraulic fluid used in connection with the time delay mechanism.

It should be pointed out that each of the elements of control means 200 which is identical to a corresponding element of control means 100 has been designated by an identical numeral.

A solenoid 160 and core 161 of a time delay valve 130 of control means 200 are, as in the case of control means 100, mounted in a recess in an upper casing portion 110. A separate casing portion 184 forms a vertical passage 185 which connects reservoir 182 with the chamber portions 126 and 127 by means of passage 164 through core 161 and passage 153.

For controlling the flow of liquid from reservoir 182 to the chamber portions 126 and 127, a fluid actuated valve unit, indicated generally at 187, is mounted in casing portion 184 below the reservoir 182. Fluid actuated valve unit 187 further provides an escape for any air bubbles which may be present in the hydraulic liquid contained in the control means 200. Such unit 187 includes a lower resilient valve member 188 which prevents the movement of liquid from chamber portions 126 and 127 through passages 189 to reservoir 182 when retarding means 124 is actuated. An upper resilient valve member 190 serves to retain passages 191 closed against fluid flow to reservoir 182 up to a predetermined fluid pressure required in chamber portions 126 and 127 for proper operation of the time delay mechanism located therein. The lower resilient valve member 188 is arranged to permit free passage of hydraulic liquid from reservoir 182 through passages 189 to chamber portions 126 and 127 so that such chambers are always maintained full of liquid notwithstanding any slight leakage which may be present in the hydraulic system.

Figure 8:
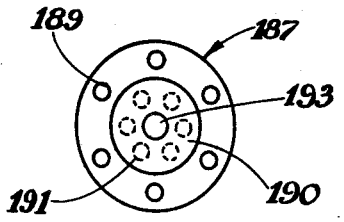
FIGURE 8 is a top elevational view of a fluid actuated valve unit comprising a portion of the control means of FIGURE 7.
Figure 9:
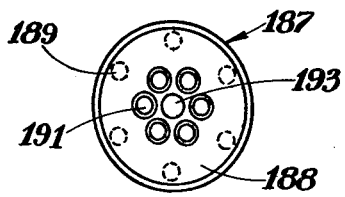
FIGURE 9 is a bottom elevational view of the fluid actuated valve unit of FIGURE 7.

FIGURE 8 is a top view of fluid actuated valve unit 187 showing upper resilient valve member 190 overlying the passages 191 but being of lesser diameter than the unit whereby the upper ends of passages 189 are uncovered. FIGURE 9 is a bottom view of valve unit 187 showing the lower resilient member 188 underlying the passages 189 and provided with holes corresponding with the locations of passages 191 whereby the lower ends of such passages are always open to the entry of fluid.

The upper and lower resilient valve members 188 and 190 are mounted to the upper and lower surfaces of the body of valve unit 187 by means of a shouldered pin 193 passing centrally through the body of the unit, with such pin being extended vertically downwardly into passage 185 to provide a retainer for a spring 162 adapted to constantly urge time delay valve 130 towards the closed position illustrated.

Reference is again made to FIGURE 10 which diagrammatically illustrates an electrical sensing apparatus adapted to operate the time delay mechanism of the previously described control means 100 or 200. A mercury switch 165 is provided with a pair of contact points 168 at one inclined end of a horizontal tube 166 and a second pair of contacts 170 at the other inclined end of horizontal tube 166. When the quantity of mercury connects either of the pair of contacts 168 or 170, which occurs when the vehicle encounters centrifugal force at curve entry, a solenoid 242 of holding relay 171 is energized and a core 244 becomes magnetized whereby pivoted arm 245 pivots on pin 246 and moves downwardly against the action of tension spring 243 to make contact between an upper contact 248 and a lower contact 249.

The mercury switch contacts 168 connect the source of electricity 172 with solenoid 242 by wires 173 and 178. The other mercury switch contacts 170 connect source 172 with solenoid 242 by wires 173 and 178.

A fluid actuated switch 240 is provided in parallel with mercury switch 165 to render inoperative the electrically operated time delay valve 130 located within the control means 100 or 200 when the vehicle encounters an inertia force which would cause longitudinal pitch of the vehicle. Such would occur when the vehicle is to be suddenly decelerated or stopped. Switch 240 includes a fluid chamber 252 fitted with a piston 253. A line 254 leading from chamber 252 can be connected to the hydraulic brake system of the vehicle, or to another suitable source of pressurized fluid. When chamber 252 is pressurized piston 253 moves upwardly against the action of a return spring 256 whereby piston 253 electrically connects a pair of contacts 257 and 258. The contacts 257 and 258 energize solenoid 242 of holding relay 171 with the source of electric energy by means of the wires 173 and 178.

The upper contact 248 of relay 171 is provided with an adjustable stop provided by a screw 260 adjustably carried by a dielectric bracket 261 mounted on metallic base 262 which base also adjustably supports lower contact 249. The dielectric bracket 261 insulates upper contact 248 from lower contact 249 when the former is in the upper position illustrated. The base 262 serves as a conductor between lower contact 249 and a wire 175 which leads to the solenoid 160 of time delay valve 130 within control means 100 or 200.

When contact 248 engages contact 249 by action of solenoid 242, then the solenoid 160 of time delay valve 130 is connected to the source of electric energy by wires 173, 179, arm 245, contact 248, contact 249, and wire 175. As seen in FIGURES 6 and 7 the element 129 opens the larger passage 131 whereby retarding means 124, and hence spool 52, will move rapidly to quickly institute on anti-roll or anti-pitch correction as required.

With continued reference to FIGURE 10, and also FIGURES 6 and 7 when the vehicle leaves a curve and enters a stretch of straight road it is desirable to continue to maintain the time delay mechanism inoperative for a period of time after the centrifugal force has ceased and the mercury switch 165 has broken contact, in order that the control means 100 or 200 can rapidly, without time delay, make corrections in the chambers 305 or 30, FIGURES 2 and 5, which corrections are required because centrifugal force is ceasing and the unequal pressures in such chambers required in the curve to levelize the vehicle, are no longer required in the straight stretch of road being entered. Hence it is desirable to maintain the time delay mechanism inoperative and hence the solenoid 160 of the time delay switch 130, FIGURES 6 and 7, and the solenoid 242 of the holding relay 171 must both be maintained energized.

To maintain solenoids 242 and 160 energized after mercury switch 165 or the brake operated fluid actuated switch 240 has broken contact, a condenser 265 is connected in parallel with solenoid 242 of the holding relay. The plates 266 of the condenser are connected to wire 178 and plates 277 of the condenser are grounded by a wire 268.

When one of the switches 165 or 240 connects the source of electric energy 172 to the solenoid 242 of the holding relay, arm 245 is attracted downwardly to connect contacts 248 and 249 and condenser 265 is charged. So long as switch 162 or 240 is closed, the time delay switch 130 in the control means 100 or 200, will remain connected to the source 172 and receive electric current therefrom. When the closed switch 165 or 240 is opened, as occurs in coming out of a curve or when the brake pressure used in stopping is decreased, then the condenser 265 will begin to release its stored charge and continue to discharge for a time interval whereby solenoid 242 remains energized and the contacts 248 and 249 are maintained in engagement subsequent to opening of switch 165 or 240.

When condenser 265 discharges, the arm 245 is moved upwardly against stop 260 whereby time delay valve 130 is closed and the control means 100 or 200 is rendered non-responsive to road imposed impacts of short time duration in the manner previously described.

It will be understood that each of the control means 100 or 200 can be applied to each of the four wheels of a motor vehicle whereby anti-roll control, as well as corrections for variations in static weight changes, is effected at each of the four wheels of the vehicle. As an alternative, if it is desired to effect anti-roll control at only say the front wheels of the vehicle, then a control means 100 or 200 would be applied at each of the front wheels of the vehicle, and a structurally more simple and less expensive control means, without a time delay control valve such as solenoid operated time delay control valve 130, could be utilized at the rear wheels of the vehicle. In such latter instance, corrections for static weight distribution would be made by a control means at each of the four wheels, but only the control means at the right front wheel and the control means at the left front wheel would rapidly institute anti-roll corrections in the manner described in detail herein.

Reference is next made to FIGURE 11 which illustrates a third hydraulic-pneumatic means comprising another aspect of the present invention. Such means is indicated generally at 700 and includes an upper casing portion 701, a lower casing portion 702, and a removable cover portion 730. Upper casting portion 701 forms a chamber 305 and includes a second chamber 330 separated by a moveable wall means 333. Chamber 330 contains a compressible fluid, such as air, which is introduced through a valve fitting 332 extended through the casing and the wall of a flexible bag which bag forms the confines of chamber 330. The compressible fluid in chamber 330 is expanded and compressed by oscillation of the vehicle suspension and forms the spring means at the wheel at which the unit is mounted.

At this point it should be generally stated that hydraulic-pneumatic means 700 is incorporated in a system such as that illustrated in FIGURE 1. A pump 40 delivers pressurized hydraulic fluid to a control means 100, previously described, which in turn delivers fluid to or releases fluid from a chamber 703 in means 700 via a line 50. Control means 100 senses relative movement between sprung and unsprung weights of the vehicle, away from a normal configuration datum, and controls fluid passage through line 50 to maintain a constant distance D between the sprung and unsprung weights. When control means 100 releases fluid from chamber 703 it passes to a main reservoir 44 in the manner of the previously described system of FIGURE 1.

As seen in FIGURE 11, a piston 717 is carried in casing portion 702 and includes a rod 716 extended through holes 732 and connected to the unsprung weight 22 at a pivotal connection 302. Since rod 716 extends through an auxiliary reservoir 705, later to be described, separate seals 714 and 715 are provided at the junction of the rod surface with the casing and cover. An upper connector 328 on upper casing portion 701 forms a pivotal connection with the spring weight at 301. Piston 717 separates a chamber 703 from a chamber 704. Chamber 703 communicates with chamber 305 via a first passage provided with a flow restrictor 720 and a second passage provided with a dump valve 726. Chamber 704, on the other side of piston 717, is provided with a flow restrictor 710 and dump valve 712 whereby chamber 704 communicates with an auxiliary fluid reservoir 705, the latter being in fluid communication with the main fluid reservoir of the system as is diagrammatically illustrated at 44 in FIGURE 11. Such a main reservoir is also illustrated at 44 in the system of FIGURE 1.

It will now be understood that when the distance between the sprung and unsprung weights increases, during operation of the vehicle, surface 719 on the piston forces fluid through flow resistor 710 to provide shock absorber action for the down stroke. Chamber 703 is maintained full, on such down stroke, of fluid from chamber 305 via dump valve 726. When the distance between the sprung and unsprung weights decreases, upper surface 718 on the piston forces fluid through flow restrictor 720 to provide shock absorber action for the up-stroke. On such up-stroke chamber 704 is maintained full of fluid from auxiliary reservoir 705 via dump valve 712.

To provide anti-cavitation means for assuring chamber 704 is maintained full of fluid, when rapid oscillations of piston 717 occur, an upper chamber portion 706 of auxiliary reservoir 705 may be maintained full of a confined compressible fluid such as air. This may be effected by locating the inlet port for line 391 below the top of the auxiliary reservoir 705 whereby the fluid level 735 is established materially below the top of the auxiliary reservoir. The chamber portion 706 will fill with air which is at atmospheric pressure when the piston 717 is at normal configuration datum line 60. Hence it will be understood that the gas in chamber portion 706 is compressed on the down-stroke of the piston and therefore has the capacitiy to expand on the up-stroke of the piston to drive fluid through dump valve 712 at a rapid rate. Hence chamber 704 is maintained full of fluid under all conditions.

With reference to FIGURE 12, the bottom surface of upper flow restrictor 720 is shown provided with grooves 738 that form normal flow restrictor passages past the seat when the flow restrictor is seated. Under higher fluid flow velocities the flow restrictor 720 is lifted from its seat by the flowing fluid. Lower flow restrictor 710 may be provided with similar grooves 738 to form restrictor passages for normal flow, with such restrictor 710 being lifted from its seat at higher flow rates.

The magnitude of flow restriction provided by upper flow restrictor 720 is varied in proportion to the fluid pressure in chamber 305 which in turn is varied in proportion to the load between sprung and unsprung weight portions. This is achieved by a mechanism which includes a movable element 740 slideably extended through a hole 347 through upper casing portion 701. A seal 348 is provided at the confronting surfaces of element 740 and hole 347. An outer surface 345 on element 740 is exposed to atmospheric pressure whereas the inner surface of the element is exposed to the higher fluid pressure in chamber 305. Hence an outwardly directed unbalanced fluid force biases element 740 to the right, as seen in FIGURE 11, against the force exerted by a spring 721 disposed between flow restrictor 720 and a spring loader 722. The latter is pivotally mounted to the casing at a pin 723. A restricted portion 741 of element 740 is connected to an upstanding arm of spring loader 722 at a slot 724 and pin 725.

In operation, when the fluid pressure in chamber 305 increases, under increased loading of the vehicle, or when inertia forces are encountered, element 740 is moved to the right under such increased pressure whereby spring 721 is compressed to increase the magnitude of flow restriction imposed on fluid passing from chamber 703 to chamber 305 on the up-stroke of piston 717. When the pressure in chamber 305 decreases, the force in spring 721 and hence the magnitude of flow restriction is decreased in proportion to the decrease in the magnitude of the force being imposed on the vehicle.

With reference to lower flow restrictor 710, the magnitude of flow restriction imposed by such element is also varied according to the existing fluid pressure in chamber 305 but by means of a mechanism different from that of upper flow restrictor 720. A spring 711 is interposed between lower flow restrictor 710 and a spring loader 709 is slideably carried in a small cylinder 708 formed in cover portion 730. One side of spring loader 709 is exposed to fluid pressure of auxiliary reservoir 705, which is atmospheric or relatively low as previously described, and the other side of spring loader 709 is exposed to the fluid pressure of chamber 305 via a passage 707 and the small cylinder 708. Hence it will be understood that when the pressure in chamber 305 increases, under increased static or dynamic forces imposed on the vehicle, then spring loader 709 will move upwardly in small cylinder 708. The force in spring 711 is thereby increased whereby the magnitude of restriction imposed on fluid flow from chamber 704 to auxiliary reservoir 705 is increased in proportion to the increased load imposed on the vehicle.

When the fluid pressure in chamber 305 decreases, under decreases in static or dynamic forces being imposed on the vehicle, then the element 740 will move to the left, decreasing the force in spring 721, and spring loader 709 will move downwardly, decreasing the force in spring 711. Hence the magnitude of flow restriction imposed by flow restrictors 720 and 710 is automatically decreased in proportion to the magnitude of decrease of the static or dynamic force imposed on the vehicle.

The operation of hydraulic-pneumatic means 700 of FIGURE 11 differs from that of hydraulic-pneumatic means 300 of FIGURE 2 in that in the case of means 700 the static weight of the vehicle is borne by the fluid force exerted on the top surface 718 of piston 717. The under surface 719 of piston 717 is subjected to atmospheric or only relatively low pressure values. Hence with the means 700 of FIGURE 11 no high pressure seal is required at the exit of rod 716 from the casing. In contrast, with the hydraulic-pneumatic means 300 of FIGURE 2 the static weight of the vehicle is borne by the forces tending to expel the rod volume of the piston rod from the casing and both the upper and lower chambers 306 and 307 of means 300 are subjected to the same high pressure. Hence with the hydraulic-pneumatic means 300 of FIGURE 2 the previously described high pressure seal and drain arrangement is provided at the exit of the piston rod from the casing.

In operation, when the pressure in chamber 305 of the hydraulic-pneumatic means 700 is for any reason increased, then the shock absorber action is increased, and, at the same time, resilient means 330 is compressed whereby the spring rate, or loading per unit of deflection, is increased. Conversely, when the pressure in chamber 305 decreases, both the shock absorber action and spring rate are decreased. Hence it will be understood that the hydraulic-pneumatic means 700, in combination with the control means 100, previously described, provide a novel controlled vehicle suspension which maintains the vehicle level under all variations in static and dynamic loading encountered by the vehicle. Moreover, the spring rate and shock absorbed action are automatically varied in proportion to such variations in loadings and forces imposed on the vehicle.

Further objects and advantages of the present invention will be apparent from the following description, reference being had to the accompanying drawings wherein preferred forms of embodiments of the invention are clearly shown.

I claim:

1. Apparatus for controlling the suspension system of a vehicle having sprung and unsprung weight portions connected by resilient means, which apparatus comprises; fluid actuated means for varying the force exerted by said resilient means between said sprung and unsprung portions, said fluid actuated means including casing means forming a first chamber and a second chamber; conduit means for conducting pressurized fluid to said fluid actuated means; valve means in said conduit means for controlling the flow of fluid therein; detector means operatively connected to said valve means, said detector means serving to sense relative movement between said sprung and unsprung portions away from a normal configuration thereof; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers.

2. Apparatus for controlling the suspension system of a vehicle having sprung and unsprung weight portions connected by resilient means, which apparatus comprises; fluid actuated means for varying the force exerted by said resilient means between said sprung and unsprung portions, said fluid actuated means including casing means forming a first chamber and a second chamber; conduit means for conducting pressurized fluid to said fluid actuated means; valve means in said conduit means for controlling the flow of fluid therein; detector means operatively connected to said valve means, said detector means serving to sense relative movement between said sprung and unsprung portions away from a normal configuration thereof; fluid actuated retarding means operatively connected to said valve means; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers.

3. Apparatus for controlling the suspension system of a vehicle having sprung and unsprung weight portions connected by resilient means, which apparatus comprises; fluid actuated means for varying the force exerted by said resilient means between said sprung and unsprung portions, said fluid actuated means including casing means forming a first chamber and a second chamber; conduit means for conducting pressurized fluid to said fluid actuated means; valve means in said conduit means for controlling the flow of fluid therein; detector means operatively connected to said valve means, said detector means serving to sense relative movement between said sprung and unsprung portions away from a normal configuration thereof; fluid actuated retarding means operatively connected to said valve means; variable flow restricting means for fluid moved by said retarding means; means for automatically actuating said flow restricting means responsive to a force encountered by said vehicle; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers.

4. Apparatus for controlling the suspension system of a vehicle having sprung and unsprung weight portions connected by resilient means, which apparatus comprises; fluid actuated means for varying the force exerted by said resilient means between said sprung and unsprung portions, said fluid actuated means including casing means forming a first chamber and a second chamber; conduit means for conducting pressurized fluid to said fluid actuated means; valve means in said conduit means for controlling the flow of fluid therein; detector means operatively connected to said valve means, said detector means serving to sense relative movement between said sprung and unsprung portions away from a normal configuration thereof; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers; and means forming a chamber containing a compressible fluid, said chamber including a moveable wall having an outer surface exposed to the fluid of said fluid actuated means whereby said chamber and compressible fluid provide said resilient means.

5. Apparatus for automatically controlling the suspension system of a vehicle while negotiating a curve for improving the cornering characteristics thereof, said vehicle being of the type wherein four unsprung weight portions are each independently connected to a sprung weight portion by a resilient means, which apparatus comprises; separate detector means for each of said unsprung portions, each detector means serving to sense relative movement, between its respective unsprung portion and said sprung portion, away from a normal configuration; and separate fluid actuated means for each of said resilient means, each fluid actuated means being variably responsive to a respective one of said detector means for varying the force effect in a respective one of said resilient means, each of said fluid actuated means including casing means forming a first chamber and a second chamber; means for effecting a time sensitive response between each fluid actuated means and its respective detector means whereby said variations in force effect are substantially prevented during road-imposed relative movements of short time duration; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers.

6. Apparatus for automatically controlling the suspension system of a vehicle while negotiating a curve for improving the cornering characteristics thereof, said vehicle being of the type wherein four unsprung weight portions are each independently connected to a sprung weight portion by a resilient means, which apparatus comprises; separate detector means for each of said unsprung portions, each detector means serving to sense relative movement, between its respective unsprung portion and said sprung portion, away from a normal configuration; and separate fluid actuated means for each of said resilient means, each fluid actuated means being variably responsive to a respective one of said detector means for varying the force effect in a respective one of said resilient means, each of said fluid actuated means including casing means forming a first chamber and a second chamber; fluid responsive time delay means for effecting a time sensitive response between each fluid actuated means and its respective detector means whereby said variations in force effect are substantially prevented during road-imposed relative movements of short time duration; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers.

7. Apparatus for automatically controlling the suspension system of a vehicle while negotiating a curve for improving the cornering characteristics thereof, said vehicle being of the type wherein four unsprung weight portions are each independently connected to a sprung weight portion by a resilient means, which apparatus comprises; separate detector means for each of said unsprung portions, each detector means serving to sense relative movement, between its respective unsprung portion and said sprung portion, away from a normal configuration; and separate fluid actuated means for each of said resilient means, each fluid actuated means being variably responsive to a respective one of said detector means for varying the force effect in a respective one of said resilient means, each of said fluid actuated means including casing means forming a first chamber and a second chamber; means for effecting a time sensitive response between each fluid actuated means and its respective detector means whereby said variations in force effect are substantially prevented during road-imposed relative movements of short time duration; piston means mounted for reciprocating movement in said second chamber, said piston means and casing means being connected between said sprung and unsprung weight portions; shock absorber means including a flow restrictor operative between said second chamber and said first chamber for restricting the expulsion of fluid from said second chamber upon movement of said piston means in one direction; a check valve for the unrestricted passage of fluid from said first chamber to said second chamber upon movement of said piston means in the other direction; means for varying the magnitude of resistance imposed by said shock absorber means; and means forming a third chamber containing a compressible fluid, said chamber including a movable wall having an outer surface exposed to the fluid of said fluid actuated means whereby said chamber and compressible fluid provide said resilient means.

8. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; valve means for connecting said fluid actuated means either with said fluid pump or said zone, said valve means serving to isolate said fluid actuated means from both said pump and said zone when said portions are in said normal suspension configuration; valve actuating means for operating said valve means responsive to variations in said distance between said portions; fluid responsive time delay means for effecting a time delay between the occurrence of relative movement between said portions and actuation of said valve means; means for selectively rendering said time delay means operative or ineffective; an inertia responsive control means for operating said means for connecting and disconnecting said time delay; shock absorber means for said fluid actuated means; and means for varying the magnitude of resistance imposed by said shock absorber means.

9. In a suspension system for a vehicle having a sprung weight portion and an unsprung weight portion connected by resilient means, the combination of fluid actuated means for varying the force exerted by said resilient means between said portions when the distance between said portions tends to vary from a normal configuration, said fluid actuated means including casing means forming a first chamber and a second chamber; a fluid pump for delivering pressurized fluid to said fluid actuated means; means forming a zone of relatively low pressure for receiving fluid from said fluid actuated means; valve means for connecting said fluid actuated means either with said fluid pump or said zone, said valve means serving to isolate said fluid actuated means from both said pump and said zone when said portions are in said normal suspension configuration; valve actuating means for operating said valve means responsive to variations in said distance between said portions; means for effecting a time delay between the occurrence of relative movement between said portions and actuation of said valve means; means for selectively rendering said time delay means operative or ineffective; an inertia responsive control means for operating said means for connecting and disconnecting said time delay; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers.

10. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; valve means for connecting said fluid actuated means either with said fluid pump or said zone, said valve means serving to isolate said fluid actuated means from both said pump and said zone when said portions are in said normal suspension configuration; valve actuating means for operating said valve means responsive to variations in said distance between said portions; fluid responsive time delay means for effecting a time delay between the occurrence of relative movement between said portions and actuation of said valve means; means for selectively rendering said time delay means operative or ineffective; an inertia responsive control means for operating said means for connecting and disconnecting said time delay; and means for varying the rate of said resilient means to change the force exerted per unit of deflection thereof, said rate variation being effected responsive to variations in the pressure of the fluid in said fluid actuated means.

11. In a suspension system for a vehicle having a sprung weight portion and an unsprung weight portion connected by resilient means, the combination of fluid actuated means for varying the force exerted by said resilient means between said portions when the distance between said portions tends to vary from a normal configuration, said fluid actuated means including first and second chambers; piston means mounted for reciprocating movement in said second chamber, said piston means and casing means being connected between said sprung and unsprung weight portions; shock absorber means including means forming first and second passage means between said first and second chambers, certain of said passage means including a fluid actuated valve element forming a flow restrictor for the passage of fluid between said chambers; a fluid pump for delivering pressurized fluid to said fluid actuated means; means forming a zone of relatively low pressure for receiving fluid from said fluid actuated means; valve means for connecting said fluid actuated means either with said fluid pump or said zone, said valve means serving to isolate said fluid actuated means from both said pump and said zone when said portions are in said normal suspension configuration; valve actuating means for operating said valve means responsive to variations in said distance between said portions; fluid responsive time delay means for effecting a time delay between the occurrence of relative movement between said portions and actuation of said valve means; means for selectively rendering said time delay means operative or ineffective; an inertia responsive control means for operating said means for connecting and disconnecting said time delay; and means forming a chamber containing a compressible fluid, said chamber including a movable wall having an outer surface exposed to the fluid of said fluid actuated means whereby said chamber and compressible fluid provide said resilient means.

12. A control apparatus for a vehicle suspension system of the type having sprung and unsprung weight portions and resilient means operatively interposed between said portions, said apparatus comprising, in combination, casing means including a first chamber and a second chamber containing a hydraulic fluid; means forming a third chamber containing a compressible fluid, said third chamber and compressible fluid forming said resilient means between said portions; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; pressure responsive flow control means for certain of said passage means, said flow control means including a surface exposed to fluid of certain of said chambers; a third passage means through said piston means; and a valve element for said third passage means.

13. A control apparatus for a vehicle suspension system of the type having sprung and unsprung weight portions and resilient means operatively interposed between said portions, said apparatus comprising, in combination, casing means including a first chamber and a second chamber containing a hydraulic fluid; means forming a third chamber containing a compressible fluid, said third chamber and compressible fluid forming said resilient means between said portions; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a flow restrictor element; spring means for urging said flow restrictor element towards a flow restricting position against the flow of fluid from said second chamber to said first chamber; and a movable member for varying the force exerted by said spring means on said flow restrictor, said movable member including a surface exposed to fluid of certain of said chambers.

14. A control apparatus for a vehicle suspension system of the type having sprung and unsprung weight portions and resilient means operatively interposed between said portions, said apparatus comprising, in combination, casing means including a first chamber and a second chamber; passage means through the wall of certain of said chambers for connecting same to a source of pressurized hydraulic fluid; means forming a third chamber containing a compressible fluid, said third chamber including a movable wall having an outer surface exposed to fluid of said first chamber; valve means for said passage means; fluid actuated retarding means operatively connected to said valve means; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; pressure responsive flow control means for certain of said passage means, said flow control means including a surface exposed to fluid of certain of said chambers; and a movable operator element including a surface exposed to fluid in certain of said chambers, said operator element being operatively associated with said flow control means for varying the resistance imposed by said surface on the flow of fluid.

15. A control apparatus for a vehicle suspension system of the type having sprung and unsprung weight portions and resilient means operatively interposed between said portions, said apparatus comprising, in combination, casing means including a first chamber and a second chamber; conduit means through the wall of certain of said chambers for connecting same to a source of pressurized hydraulic fluid; means forming a third chamber containing a compressible fluid, said third chamber including a movable wall having an outer surface exposed to fluid of said first chamber; valve means for said passage means; fluid actuated retarding means operatively connected to said valve means; variable flow restricting means for fluid moved by said retarding means; means for automatically actuating said flow restricting means responsive to a force encountered by said vehicle; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; pressure responsive flow control means for certain of said passage means, said flow control means including a surface exposed to fluid of certain of said chambers; and means including a surface exposed to fluid of certain other of said chambers for varying the effect of said flow control means.

16. A control apparatus for a vehicle suspension system of the type having sprung and unsprung weight portions and resilient means operatively interposed between said portions, said apparatus comprising, in combination, casing means including a first chamber and a second chamber; conduit means through the wall of certain of said chambers for connecting same to a source of pressurized hydraulic fluid; means forming a third chamber containing a compressible fluid, said third chamber including a moveable wall having an outer surface exposed to fluid of said first chamber; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; pressure responsive flow control means for certain of said passage means, said flow control means including a surface exposed to fluid of certain of said chambers; and a third passage means for releasing air from a zone of said second chamber beneath said piston.

17. In a control apparatus for a vehicle suspension system of the type having sprung and unsprung weights; the combination of a casing including a cylinder, a first chamber, a second chamber, and a hole through a wall of said cylinder; piston means mounted for reciprocation in said cylinder and including a rod extended through said hole, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers, a first fluid seal at the junction of said rod with said hole; a second fluid seal at the junction of said rod with said hole; and a fluid drain intermediate said two fluid seals.

18. In a control apparatus for a vehicle suspension system of the type having sprung and unsprung weights; the combination of a casing including a cylinder, a first chamber, a second chamber, and a hole through a wall of said cylinder; piston means mounted for reciprocation in said cylinder and including a rod extended through said hole, said piston means and casing means being connected between said sprung and unsprung weight portions; a first passage means connecting said first chamber with said second chamber on one side of said piston means; a second passage means connecting said first chamber with said second chamber on the other side of said piston means; and pressure responsive flow control means for certain of said passage means, said flow control means including a surface exposed to fluid of certain of said chambers; fluid translating means for delivering pressurized fluid to the interior of said casing; reservoir means for supplying fluid to said fluid translating means; a first fluid seal at the junction of said rod with said hole; a second fluid seal at the junction of said rod with said hole; and a fluid drain intermediate said two fluid seals and connected to said reservoir means.

19. A control apparatus for a vehicle suspension system of the type having sprung and unsprung weight portions and resilient means operatively interposed between said portions, said apparatus comprising, in combination, casing means including a first chamber and a second chamber containing a hydraulic fluid; conduit means through the wall of certain of said first and second chambers for connecting same to a source of pressurized hydraulic fluid; reservoir means containing hydraulic fluid at relatively low pressure; means forming a third chamber containing a compressible fluid, said third chamber and compressible fluid forming said resilient means between said portions; piston means mounted for reciprocating movement in said second chamber, said piston means and casing means being connected between said sprung and unsprung weight portions; passage means for connecting said second chamber on one side of said piston to said first chamber; passage means for connecting said second chamber on the other side of said piston to said reservoir means; variable flow restricting means for fluid translated by movement of said piston in said second chamber; and means for varying the magnitude of restriction imposed by said flow restricting means responsive to variations in the magnitude of a force imposed on said vehicle.

20. A control apparatus for a vehicle suspension system of the type having sprung and unsprung weight portions and resilient means operatively interposed between said portions, said apparatus comprising, in combination, casing means including a first chamber and a second chamber containing a hydraulic fluid; conduit means through the wall of certain of said first and second chambers for connecting same to a source of pressurized hydraulic fluid; reservoir means containing hydraulic fluid at relatively low pressure; means forming a third chamber containing a compressible fluid, said third chamber including a moveable wall having an outer surface exposed to fluid of said first chamber; piston means mounted for reciprocating movement in said second chamber, said piston means and casing means being connected between said sprung and unsprung weight portions; passage means for connecting said second chamber on one side of said piston to said first chamber; passage means for connecting said second chamber on the other side of said piston to said reservoir means; variable flow restricting means for fluid translated by movement of said piston in said second chamber; and means for varying the magnitude of restriction imposed by said flow restricting means responsive to variations in the magnitude of a force imposed on said vehicle.

21. Mechanisms defined in claim 19 characterized by said means for varying the magnitude of said flow restriction including a pressure responsive element exposed to the fluid of certain of said chambers.

22. Mechanisms defined in claim 19 characterized by said reservoir means containing a compressible fluid for pressurizing said hydraulic fluid delivered to said reservoir means by said piston.

23. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; valve means for connecting said fluid actuated means either with said fluid pump or said zone, said valve means serving to isolate said fluid actuated means from both said pump and said zone when said portions are in said normal suspension configuration; valve actuating means for operating said valve means responsive to variations in said distance between said portions; fluid responsive time delay means for effecting a time delay between the occurrence of relative movement between said portions and actuation of said valve means; means for selectively rendering said time delay means operative or ineffective; an inertia responsive control means for operating said means for connecting and disconnecting said time delay; means for varying the rate of said resilient means to change the force exerted per unit of deflection thereof, said rate variation being effected responsive to variations in the pressure of the fluid in said fluid actuated means; shock absorber means for said fluid actuated means; and means for varying the magnitude of resistance imposed by said shock absorber means.

24. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; valve means for connecting said fluid actuated means either with said fluid pump or said zone, said valve means serving to isolate said fluid actuated means from both said pump and said zone when said portions are in said normal suspension configuration; valve actuating means for operating said valve means responsive to variations in said distance between said portions; fluid responsive time delay means for effecting a time delay between the occurrence of relative movement between said portions and actuation of said valve means; means for selectively rendering said time delay means operative or ineffective; an inertia responsive control means for operating said means for connecting and disconnecting said time delay; means forming a chamber containing a compressible fluid, said chamber including a movable wall having an outer surface exposed to the fluid of said fluid actuated means whereby said chamber and compressible fluid provide said resilient means; shock absorber means operative between said sprung and unsprung weight; and means for varying the magnitude of resistance imposed by said shock absorber means, said means including a movable element exposed to the pressure of fluid in said fluid actuated means.

25. A control apparatus for a vehicle suspension system of the type having sprung and unsprung weight portions and resilient means operatively interposed between said portions, said apparatus comprising, in combination, casing means including a first chamber and a second chamber; conduit means through the wall of certain of said chambers for connecting same to a source of pressurized hydraulic fluid; means forming a third chamber containing a compressible fluid, said third chamber including a movable wall having an outer surface exposed to fluid of said first chamber; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; pressure responsive flow control means for certain of said passage means, said flow control means including a surface exposed to fluid of certain of said chambers, said pressure responsive flow control means including a movable member provided with said surface exposed to said fluid of certain of said chambers and a second surface exposed to a zone of pressure less than pressures of said fluid; and by spring means opposing movement of said movable member by the differential of forces exerted on said surfaces.

26. A control apparatus for a vehicle suspension system of the type having sprung and unsprung weight portions and resilient means operatively interposed between said portions, said apparatus comprising, in combination, casing means including a first chamber and a second chamber; conduit means through the wall of certain of said chambers for connecting same to a source of pressurized hydraulic fluid; means forming a third chamber containing a compressible fluid, said third chamber including a movable wall having an outer surface exposed to fluid of said first chamber; piston means mounted for reciprocating movement in said second chamber, said piston means and casing means being connected between said sprung and unsprung weight portions; a first passage means connecting said first chamber with said second chamber on one side of said piston means; a second passage means connecting said first chamber with said second chamber on the other side of said piston means; pressure responsive flow control means for certain of said passage means, said flow control means including a surface exposed to fluid of certain of said chambers, said pressure responsive flow control means including a flow restrictor element; spring means for urging said flow restrictor element towards a flow restricting position against the flow of fluid from said second chamber to said first chamber; and a movable member for varying the force exerted by said spring means on said flow restrictor, said movable member including a surface exposed to said fluid of said certain of said chambers.

27. In combination with a vehicle having sprung and unsprung weight portions, a shock absorber including a casing element having closed and fixed chambers, one of said chambers forming a cylinder, said cylinder and the other of said chambers having a fluid passage therebetween; a pressure sensitive valve for controlling the flow of fluid through said passage from the cylinder to the said other chamber; a piston in said cylinder and having an actuating element extending through the said one chamber; means connecting one of said elements with the sprung weight portion; means connecting the other of said elements with the unsprung weight portion; and means responsive to variation in weight of the sprung portion for regulating the pressure on said pressure sensitive valve, said last named means including a moveable element provided with a first portion exposed to the fluid in one of said chambers and a second portion extending to the exterior of the casing.

28. In combination with a vehicle having sprung and unsprung weight portions, a shock absorber including a casing element having closed and fixed chambers, one of said chambers forming a cylinder, said cylinder and the other of said chambers having a fluid passage therebetween; a pressure sensitive valve for controlling the flow of fluid through said passage from the cylinder to the said other chamber; a piston in said cylinder and having an actuating element extending through the said one chamber; means connecting one of said elements with the sprung weight portion; means connecting the other of said elements with the unsprung weight portion; and means responsive to variation in pressure in the said other chamber for regulating the pressure on said pressure sensitive valve, said last named means including a moveable element provided with a first portion exposed to the fluid in one of said chambers and a second portion extending to the exterior of the casing.

29. In combination with a vehicle having sprung and unsprung weight portions, a hydraulic-pneumatic shock absorber including a casing element having closed and fixed liquid chambers, one of said chambers forming a cylinder, said cylinder and the other of said chambers having a fluid passage therebetween, said casing forming a third chamber for gaseous fluid and including a flexible wall common with said other of the first mentioned chambers and movable by variation in pressure of the liquid in said other of the first mentioned chambers; a pressure sensitive valve for controlling the flow of fluid through said passage from the cylinder to the said other chamber; a piston in said cylinder and having an actuating element extending through the said one chamber; means connecting one of said elements with the sprung weight portion; means connecting the other of said elements with the unsprung weight portion; and means responsive to variation in weight of the sprung portion for regulating the pressure on said pressure sensitive valve, said last named means including a moveable element provided with a first portion exposed to the fluid in one of said chambers and a second portion extending to the exterior of the casing.

30. In combination with a vehicle having sprung and unsprung weight portions, a hydraulic-pneumatic shock absorber including a casing element having closed and fixed liquid chambers, one of said chambers forming a cylinder, said cylinder and the other of said chambers having a fluid passage therebetween, said casing forming a third chamber for gaseous fluid and including a flexible wall common with said other of the first mentioned chambers and movable by variation in pressure of the liquid in said other of the first mentioned chambers; a pressure sensitive valve for controlling the flow of fluid through said passage from the cylinder to the said other chamber; a piston in said cylinder and having an actuating element extending through the said one chamber; means connecting one of said elements with the sprung weight portion; means connecting the other of said elements with the unsprung weight portion; and means responsive to variation in pressure in the said other chamber for regulating the pressure on said pressure sensitive valve, said last named means including a moveable element provided with a first portion exposed to the fluid in one of said chambers and a second portion extending to the exterior of the casing.

31. In combination, with a vehicle having sprung and unsprung weight portions, a shock absorber including a casing element having closed and fixed chambers, one of said chambers forming a cylinder, said cylinder and the other of said chambers having a fluid passage therebetween; a pressure sensitive valve for controlling the flow of fluid through said passage from the cylinder to the said other chamber; a piston in said cylinder and having an actuating element extending through the said one chamber; means connecting one of said elements with the sprung weight portion; means connecting the other of said elements with the unsprung weight portion; means responsive to variation in weight of the sprung portion for regulating the pressure on said pressure sensitive valve, said means including a moveable element provided with a first portion exposed to the fluid in one of said chambers and a second portion extending to the exterior of the casing; means forming an expandable and contractable container mounted between said weight portions and forming a third chamber containing a compressible fluid; and means forming a control chamber communicating with said third chamber, said second end portion of said moveable element being exposed to fluid in said third chamber.

32. The apparatus defined in claim 31 wherein said control chamber includes a moveable wall for operating said moveable element.

33. The apparatus defined in claim 31 wherein said moveable element includes a tapered surface and wherein a resilient means is interposed between said pressure sensitive valve and said tapered surface.

34. In combination with a vehicle having sprung and unsprung weight portions, a shock absorber including a casing element having closed and fixed chambers, one of said chambers forming a cylinder, said cylinder and the other of said chambers having a fluid passage therebetween; a pressure sensitive valve for controlling the flow of fluid through said passage from the cylinder to the said other chamber; a piston in said cylinder and having an actuating element extending through the said one chamber; means connecting one of said elements with the sprung weight portion; means connecting the other of said elements with the unsprung weight portion; means responsive to variation in weight of the sprung portion for regulating the pressure on said pressure sensitive valve, said means including a moveable element provided with a first portion exposed to the fluid in one of said chambers and a second portion extending to the exterior of the casing, said cylinder including an outlet passage on the opposite side of said piston from said pressure sensitive valve; and a flow restrictor for said outlet passage.

35. The apparatus defined in claim 34 wherein said flow restrictor is biased towards a closed position by pressurized fluid in communication with fluid in certain of said chambers.

References Cited in the file of this patent

UNITED STATES PATENTS

| | | |
|---|---|---|
| 1,641,640 | Myers | Sept. 6, 1927 |
| 1,664,510 | Hughes | Apr. 3, 1928 |
| 2,001,988 | Temple | May 21, 1935 |
| 2,102,400 | Wunsche | Dec. 14, 1937 |
| 2,141,541 | Levy | Dec. 27, 1938 |
| 2,363,867 | Isely | Nov. 28, 1944 |
| 2,620,182 | Marston | Dec. 2, 1952 |
| 2,644,699 | Weiertz | July 7, 1953 |
| 2,653,021 | Levy | Sept. 22, 1953 |
| 2,778,656 | May | Jan. 22, 1957 |
| 2,807,336 | Sweeney | Sept. 24, 1957 |
| 2,849,225 | Lucien | Aug. 26, 1958 |
| 2,866,633 | Schnitzer | Dec. 30, 1958 |
| 2,868,536 | Jungles | Jan. 13, 1959 |

FOREIGN PATENTS

| | | |
|---|---|---|
| 702,278 | Great Britain | Jan. 13, 1954 |